United States Patent [19]

Dam G. et al.

[11] Patent Number: 5,387,274
[45] Date of Patent: Feb. 7, 1995

[54] PROCESS FOR THE PRODUCTION OF IRON CARBIDE

[75] Inventors: Oscar G. Dam G.; Henry R. Bueno C., both of Edo Bolivar, Venezuela

[73] Assignee: C.V.G. Siderurgica Del Orinoco, C.A., Matanzas-Edo. Bolivar, Venezuela

[21] Appl. No.: 152,295

[22] Filed: Nov. 15, 1993

[51] Int. Cl.⁶ .............................................. C21B 13/14
[52] U.S. Cl. ..................................... 75/495; 423/439
[58] Field of Search ........................... 75/495; 423/439

[56] References Cited

U.S. PATENT DOCUMENTS

| | | | |
|---|---|---|---|
| 5,064,467 | 11/1991 | Dam G. et al. | 75/495 |
| 5,069,716 | 12/1991 | Dam G. et al. | 75/495 |
| 5,078,788 | 1/1992 | Bueno C. et al. | 75/495 |

Primary Examiner—Melvyn J. Andrews
Attorney, Agent, or Firm—Bachman & LaPointe

[57] ABSTRACT

A process for converting iron oxide to iron carbide at low pressure includes providing a reforming-reduction-carburizing reactor wherein a feed gas is reformed by contact with the iron oxide materials, the iron oxide material is reduced and thereafter contacted with a carburizing agent so as to carry out the conversion of iron oxide to iron carbide in the reactor.

26 Claims, 2 Drawing Sheets

PROCESS FOR THE PRODUCTION OF IRON CARBIDE

BACKGROUND OF THE INVENTION

The invention relates to the processing of metal oxides containing iron into non-oxide iron containing compounds and, more particularly, to a process for converting iron oxide into iron carbide.

Iron carbide has been found to be a useful starting material in the production of steel. U.S. Pat. No. RE 32,247 to Stephens, Jr. and U.S. Pat. No. 5,137,566 to Stephens, Jr. et al. relate to processes for converting reactor feed to iron carbide and thence to steel. These processes are said to be improvements over the process described in U.S. Pat. No. 2,780,537 to Stelling et al.

While the processes disclosed in the above patents are important improvements in the industry, the need still exists for further improvements and reductions in the amount of equipment required.

It is therefore the principal object of the present invention to provide an improved process for converting iron oxides into iron carbide.

It is a further object of the invention to provide such a process wherein the conversion is carried out in a single multi-zone reactor.

It is a still further object of the invention to provide a process wherein carburizing, reducing and gas reforming reactions are carried out in the reactor in an efficient manner.

It is another object of the present invention to provide a process wherein excess methane from the carburizing zone is added to recycled top gas and reformed in the reactor to provide reducing gas for incoming iron oxide material.

It is still another object of the invention to provide a process wherein the reactor is operated at a relatively low pressure.

Other objects and advantages will appear hereinbelow.

SUMMARY OF THE INVENTION

In accordance with the invention the foregoing objects and advantages are readily obtained.

The present invention is drawn to a process for direct reduction and conversion of metal oxides containing iron to iron carbide products.

The process for converting metal oxides to iron carbide in accordance with the present invention comprises providing a reforming-reduction-carburizing reactor operating at a pressure of between about 1.15 to about 1.45 bars and having a bed of partially metallized iron oxide material, a bed of direct reduced iron and a bed of iron carbide within said reactor, feeding metal oxide material containing iron to said reactor, recycling top gas from said reactor so as to provide a feed gas having a methane content of at least about 8.5% by volume, heating said feed gas to a temperature of between about 650° C. to about 850° C. mixing air at a temperature of between about 650° C. to about 850° C. with said heated feed gas in a mixing chamber, partially combusting said mixture of air and feed gas to a temperature greater than about 850° C. wherein said partially combusted gas mixture has a degree of oxidation of between about 0.27 to about 0.32 and a reducing power of between about 2 to about 3, feeding said partially combusted gas mixture to said direct reduced iron in said reactor so as to form a reformed reducing gas having an oxidation degree of between about 0.05 to about 0.09, contacting said iron oxide material with said reformed reducing gas so as to form direct reduced iron and contacting said direct reduced iron with a carburizing agent in said reactor at a temperature of between about 550° C. to about 750° C. so as to form iron carbide having between about 40.% wt to about 5.5% wt carbon and at least about 80% wt iron.

The process of the present invention allows for the conversion of iron oxides to iron carbide using a single reactor with several adjacent reaction zones whereby excess carburizing gas is mixed with recycled top gas in the presence of hot direct reduced iron (DRI) which catalyzes the reformation reaction of the gas mixture to a reducing gas which then contacts the iron oxide and directly reduces it. The endothermic reforming reaction serves to reduce the temperature of the hot DRI to the appropriate temperature for carburizing in the carburizing zone of the reactor. This arrangement greatly improves the overall efficiency of the conversion process, and also permits the process to be carried out at reduced levels of energy consumption.

BRIEF DESCRIPTION OF THE DRAWINGS

A detailed description of the preferred embodiments of the invention follows, with reference to the accompanying drawings, wherein.

DETAILED DESCRIPTION

Figure 1:
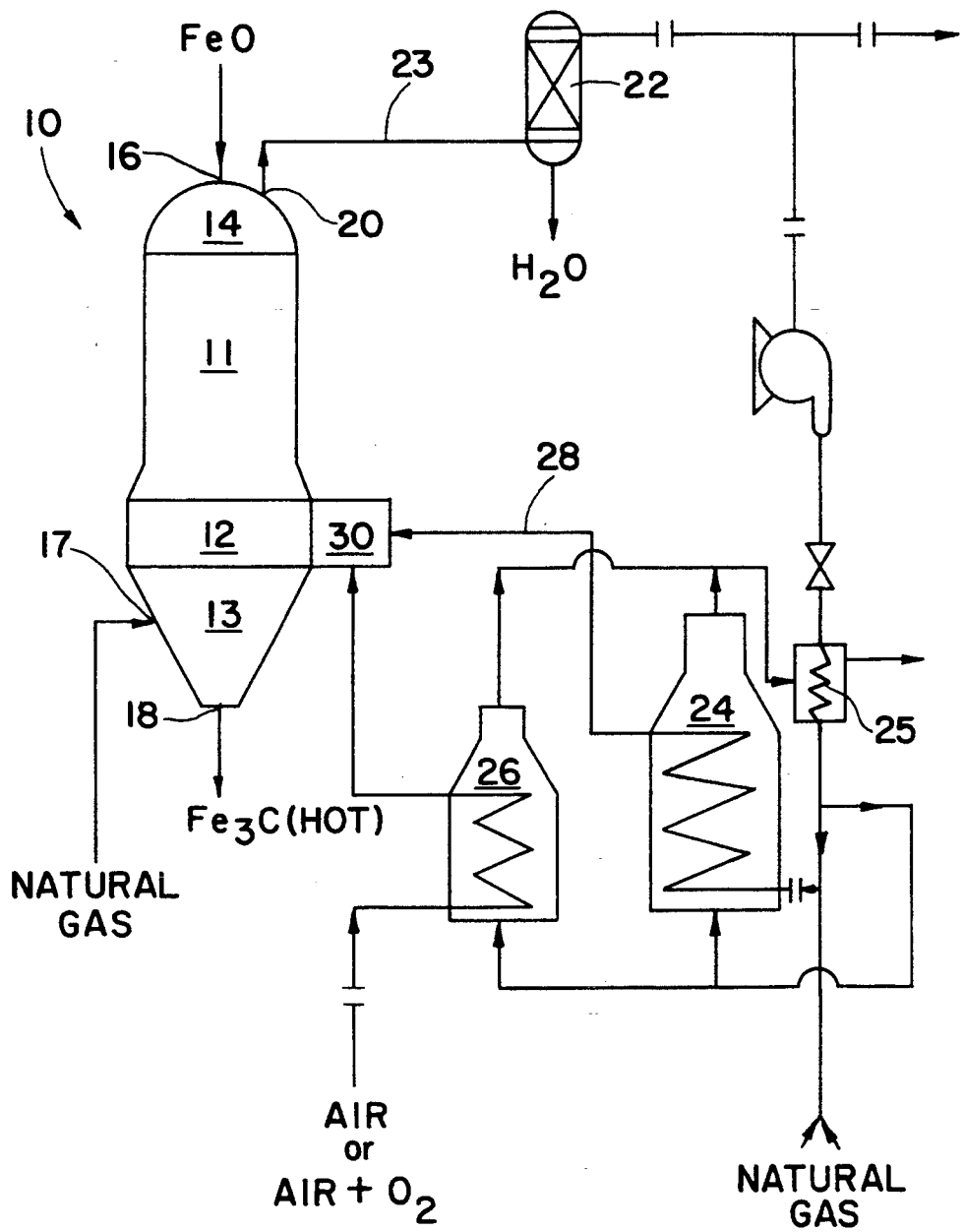
FIG. 1 schematically illustrates the process and an apparatus for performing the process of the present invention.

The invention relates to a process for the conversion of metal oxides containing iron to iron carbide in a reforming-reduction-carburizing reactor. FIG. 1 schematically illustrates a reactor 10 for carrying out the process of the invention.

According to the invention, metal oxides containing iron are fed to reactor 10 through an inlet 16. Reactor 10 contains beds of iron oxide material, direct reduced iron (DRI), and iron carbide, preferably flowing in a descending manner from inlet 16 for feed of material toward outlet 18 where iron carbide produced in accordance with the invention is discharged.

According to the invention, the iron oxide is direct reduced to metallized iron (DRI) by gas fed to the reactor 10 via line 28. The gas so fed is a recycled top gas from outlet 20 which is reformed to a reducing gas in reactor 10 prior to the DRI forming step. The DRI so formed is carburized by a carburizing gas fed to reactor 10 through inlet 17. In this regard, reactor 10 preferably has an iron oxide preheat and pre-reducing zone 14, an iron oxide reduction zone 11, a combined reformation-reduction reaction zone 12, and a carburizing zone 13, through which the feed of iron oxide material passes or flows, preferably in a descending manner, as it is being converted to iron carbide.

The metal oxide feed preferably contains iron in an amount between about 63% to about 70% by weight. The feed may be provided in lump or pellet form or any other desired form suitable for feed to reactor 10.

Top gas exits reactor 10 from outlet 20. The top gas may typically have a composition by volume of about 8.5% to 19.7% methane, about 11.3% to 14.9% carbon dioxide, about 9% to 17.8% nitrogen, about 19% to 24.7% carbon monoxide, and about 33.2% to 48.5% hydrogen. The top gas also typically has a ratio by volume of $CH_4CO_2$ of between about 0.58 to about 1.0, a ratio by volume of $CO/CO_2$ of between about 1.4 to about 1.83, and a ratio by volume of $H_2/H_2O$ of between about 1.38 to about 2.0. The top gas typically is withdrawn at a temperature of between about 350° C. to about 450° C.

The top gas is recycled to provide a feed gas to reactor 10 which has at least about 8.5% volume of $CH_4$. The top gas may suitably be recycled as follows. Top gas is carried via line 23 to a water separator unit 22. Unit 22 preferably cools the top gas to a temperature of between about 40° C. to about 60° C. and reduces the water content of the top gas to between about 1% to about 3% by volume. Unit 22 may be any suitable water separator known in the art.

After de-watering, the top gas is split into two portions. A first portion is used as fuel for heaters 24, 26, the function of which will be described further below. The remaining top gas is then preferably passed to a preheater 25 and heated to a temperature of between about 200° C. to about 300° C., and is mixed with natural gas as make up gas as needed, preferably so as to ensure a volume of $CH_4$ in the recycled top gas or feed gas of at least about 8.5% by volume. The mixture of top gas and natural gas is then passed to heater 24 (which is fueled by the first portion of the top gas) and heated to a temperature of between about 650° C. to about 850° C., preferably between about 680° C. to about 720° C. The heated gas mixture (feed gas) is then passed via line 28 to a mixer 30 of reactor 10. The heated gas is passed to mixer 30 preferably at a rate of between about 1000 to about 1100 $Nm^3$ per ton of DRI.

Air is also supplied to mixer 30, preferably via heater 26 which heats the air to a temperature of between about 650° C. to about 850° C., preferably between about 680° C. to about 720° C. The air may be oxygen enriched, preferably at a ratio of air to oxygen by volume of between about 7:1 to about 1:7. Air or air/oxygen is passed to mixer 30 at a rate of about 70 $Nm^3$/ton DRI.

The mixture of air, top gas and natural gas is then partially combusted so as to reach a temperature of greater than about 850° C., preferably between about 1000° C. to about 1100° C. The feed of top gas, natural gas, and air is preferably manipulated or stoichiometrically balanced so that the partially combusted or oxidized gas has a ratio by volume of $CH_4/(CO_2+H_2O)$ of between about 0.60:1 to about 0.63:1 and a degree of oxidation of about 0.30 to about 0.35 wherein the degree of oxidation (No) is defined in terms of volume as follows:

$$N_o = \frac{\% \ CO_2 + \% \ H_2O}{\% \ CO + \% \ CO_2 + \% \ H_2 + \% \ H_2O}.$$

In mixing chamber 30, the gas preferably has a composition by volume of about 30 to 35% $H_2$, about 15% to 17% CO, about 18% to 20% $CO_2$, about 9% to 12% $CH_4$ and about 4% to 7% water vapor. This gas is then passed into reactor 10, preferably at zone 12, having a degree of oxidation of between about 0.27 to about 0.32 and a reducing power ($N_R$) of between about 2.0 to about 3.0 wherein the reducing power is defined in terms of volume as follows:

$$N_R = \frac{\% \ CO + \% \ H_2}{\% \ CO_2 + \% \ H_2O}.$$

At the same time, a carburizing agent is fed to zone 13 via inlet 17. The carburizing agent is preferably a gas or natural gas and contains at least about 80% $CH_4$ by volume, with the balance being made up by $H_2$, CO and $CO_2$. Carburizing gas is fed to zone 13 at a rate preferably between about 400 $Nm^3$/ton to about 450 $Nm^3$/ton. Fuel oils may be used as the carburizing agent in combination with or in place of methane as referred to above. In such a case the combination of available carbon for carbonizing should be sufficient to carry out the reformation and carburizing reactions set forth above. The carburizing gas contacts direct reduced iron in zone 13 at a temperature of between about 550° C. to about 750° C. and reacts with the DRI to form iron carbide in accordance with the following reaction:

$$3Fe + CH_4 \rightarrow 2H_2 + Fe_3C.$$

Remaining carburizing gas including additional $CH_4$ flows upwardly into zone 12 and mixes with incoming gas from mixer 30 so as to provide the total gas mixture with a ratio of $CH_4/(CO_2+H_2O)$ of between about 0.65:1 to about 0.9:1. In zone 12, the mixed gas intimately contacts hot DRI material where the metallic solid iron acts as a catalyst providing a specific area of from about 12 to about 16 square meters/gram of iron for catalytic reaction. The heat from the surface area causes a highly endothermic reformation reaction of the gas, as follows:

$$CH_4 + CO_2 \rightarrow 2H_2 + CO.$$

The resulting reformed gas has a composition by volume of from about 45 to about 48% hydrogen, from about 32% to about 34% carbon monoxide, from about 2% to about 4% carbon dioxide, from about 1% to about 3% methane, from about 14% to about 16% nitrogen and from about 1% to about 3% water vapor, a degree of oxidation of between about 0.05 to about 0.09, a reducing power of between about 11 to about 29 and a ratio by volume of $CH_4/(CO+H_2)$ of between about 1:10 to about 1.4:10.

According to the invention, the endothermic reforming reaction and the upwardly flowing excess carburizing gas further serve to cool the descending DRI material to the proper temperature for the carburizing reaction. As the reformed gas flows upwardly through zone 11, iron oxide is reduced and metallized to DRI. The DRI so produced has a degree of metallization, defined as the weight percentage of total iron that has been reduced or metallized, of between about 90% to about 93%, and, due to the excess carburization gas, may contain fixed carbon in an amount of between about 0.1% to about 1.0% by weight. The reduction of iron oxides is carried out primarily in zone 11, by the $H_2$ and CO of the reformed gas, at a temperature of between about 640° C. to about 750° C., and follows the reaction:

$$2FeO + H_2 + CO \rightarrow 2Fe + H_2O + CO_2.$$

Remaining gas flowing upwardly from zone 11 contacts incoming iron oxides in zone 14. In accordance with the invention, the upflowing remaining gas is still sufficiently hot and has a sufficient reducing power so as to preheat and pre-reduce the iron oxide in zone 14, preferably to a temperature of between about 500° C. to about 550° C. and to a degree of metallization of between about 70% to about 80% based upon total weight of iron.

The remaining gas flows further upwardly through zone 14 to outlet 20 where it is discharged as top gas, typically at a temperature of between about 350° C. to about 450° C. The top gas so discharged is then further recycled in accordance with the above process.

Figure 2:
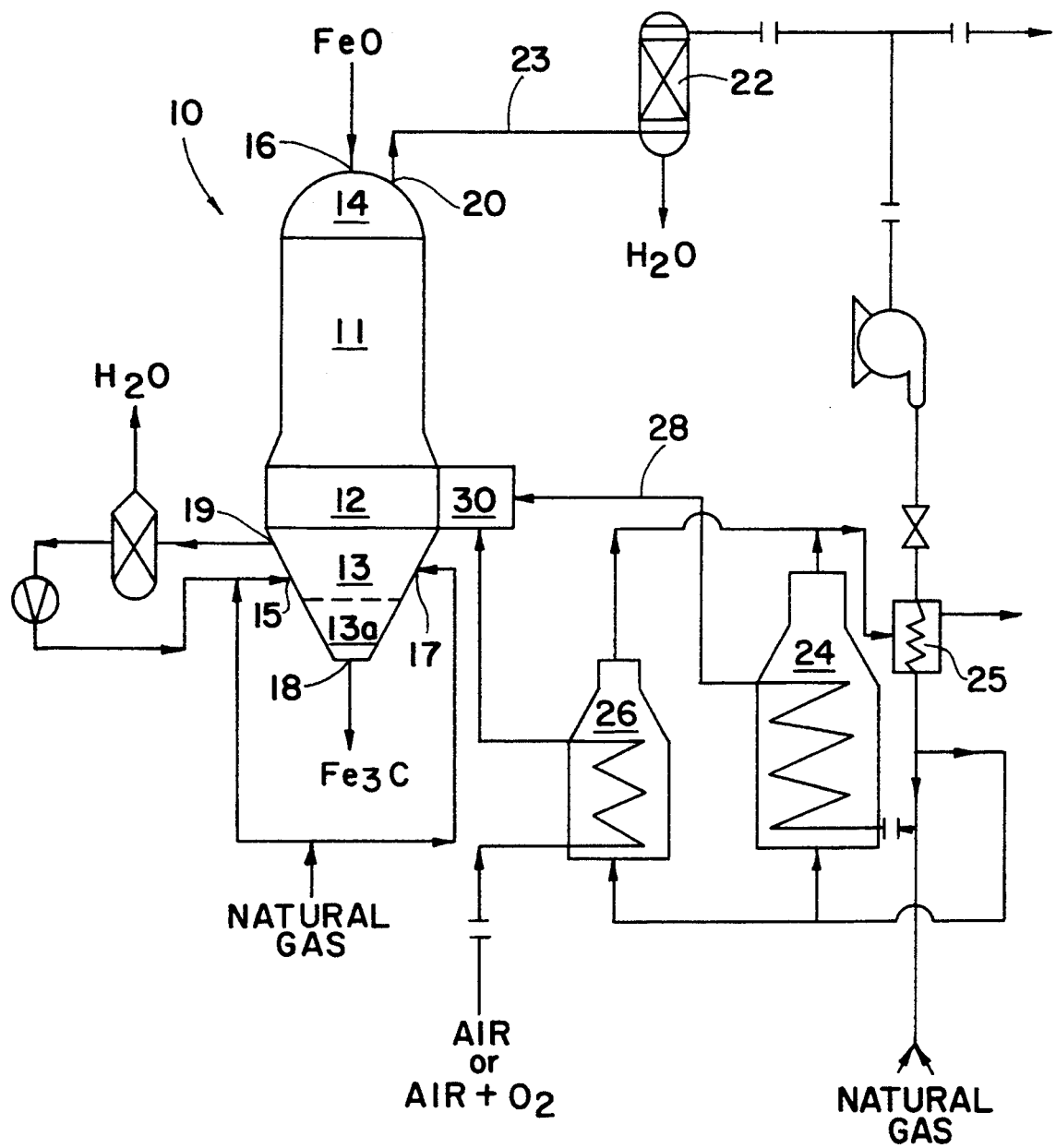
FIG. 2 schematically illustrates an alternate embodiment of the invention.

FIG. 2 illustrates an alternate embodiment of the invention wherein carburizing zone 13 is divided so as to provide an additional zone 13a for cooling and further carburizing, if desired. An inlet 15 is provided at zone 13a for feeding a cooling gas to the carburized and/or partially carburized iron descending from zone 13. In accordance with the invention, it has been found that further carburizing takes place at a specific cooled temperature window of between about 350° C. to about 400° C. The cooling gas preferably comprises between about 8% to about 10% by volume of $CH_4$ and has a ratio by volume of $CO/CO_2$ of between about 1.4 to about 2.0. The flow of carburizing gas, as set forth above, is preferably fed to zone 13 at a rate of between about 400 to about 450 $Nm^3$/ton. The rate of feed in the embodiment of FIG. 2 may be split between zones 13 and 13a in a ratio of between about 50:50 to about 80:20 by volume, respectively. A gas in accordance with the foregoing, when contacted with the DRI/iron carbide in zone 13a at the stated temperature, will further carburize the iron in accordance with the Boudouard reaction as follows:

$$3Fe + 2CO \rightarrow Fe_3C + CO_2$$

Cooling gas may be recycled from zone 13a through outlet 19 for the removal of water and other undesirable constituents and may then be recycled to inlet 15 for cooling gas as desired.

The iron carbide material leaving reactor 10 contains fixed carbon in an amount by weight of between about 40.% to about 5.5%, and contains at least about 80% wt iron.

In further accordance with the invention, heaters 24, 26 generate flue gas which may be used, as shown in the drawings, to preheat the top gas in heater 25 so as to render the process even more efficient.

In accordance with the invention, the process allows the reactor to be operated at a relatively low pressure, preferably between about 1.15 to about 1.45 bars, more preferably between about 1.3 to about 1.4 bars and most preferably at about 1.34 bars. This advantageously allows the conversion to be carried out in a single multizone reactor which may be of conventional construction.

In accordance with the invention, metal oxides containing iron are converted to iron carbide in a single multi-zone reactor. The temperature of the feed and of the gas is important at the various stages of the process and, according to the invention, the process is carried out in such a way that the various temperatures are efficiently provided.

The metal oxide feed may be introduced to reactor 10 at any desired temperature and is preferably preheated by ascending top gas in zone 14 to a temperature of between about 500° C. to about 550° C. Preheated and partially reduced iron oxide passes to zone 11 where the gas continues to heat the metal oxides to a temperature of between about 640° C. to about 750° C. and where metallization and reduction of the iron oxide to DRI continues. The DRI then passes to zone 12 where it contacts incoming gas from mixer 30 at a temperature of greater than about 850° C., preferably between about 1000° C. to about 1100° C. The DRI material at these temperatures acts as a catalyst for the reformation reaction of the gas which reaction is highly endothermic. Due to the endothermic nature of the reaction, the DRI material increases in temperature only to a temperature of between about 800° C. to about 850° C. and is then cooled to a temperature of between about 550° C. to about 750° C., preferably between about 620° C. to 680° C., by rising excess carburizing gas from zone 13. The DRI material then passes to zone 13 where the carburization reaction takes place. When it is desirable to discharge a cooled iron carbide product, a further cooling-/carburizing zone 13a may be defined in reactor 10 as shown in FIG. 2. As the iron carbide product passes to zone 13a, it contacts cooling gas which cools the iron carbide to a temperature of between about 350° C. to about 400° C. At this temperature, further carburization takes place with the cooling gas, and the iron carbide material is eventually discharged at a temperature of between about 50° C. to about 60° C.

It is noted that, depending upon the stoichiometry of the gas and feed, other iron-carbon products may also suitably and desirably be obtained such as $Fe_2C$ and the like.

Representative tests and results from an extensive test program using an industrial plant using the reduction and carburization process described about in a shaft furnace are presented in the following table.

TABLE I

EXAMPLES OF IRON CARBIDE PRODUCTION
Temp. range in the reduction zone (650–780° C.)

| Hydrocarbon | % $Fe_{TOT}$ | % $Fe°DRI$ | % C (on DRI) | % Metallization |
|---|---|---|---|---|
| Nat. gas | 83.65 | 77.32 | 5.09 | 92.43 |
| | 85.73 | 78.50 | 5.50 | 91.57 |
| | 84.00 | 76.03 | 5.82 | 90.91 |
| | 84.80 | 77.12 | 4.8 | 90.94 |
| | 84.66 | 77.93 | 5.10 | 92.06 |
| Fuel oil | 86.90 | 79.07 | 4.0 | 91.00 |

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A process for the conversion of iron oxides to iron carbide at low pressure, comprising the steps of:
   (a) providing a reforming-reduction-carburizing reactor operating at a pressure of between about 1.15 to about 1.45 bars and having a bed of partially metallized iron oxide material, a bed of direct reduced iron and a bed of iron carbide within said reactor;
   (b) feeding metal oxide material containing iron to said reactor;
   (c) providing a feed gas having a methane content of at least about 8.5% by volume;
   (d) heating said feed gas to a temperature of between about 650° C. to about 850° C. to form a reheated feed gas and a combustion flue gas;

(e) mixing air at a temperature of between about 650° C. to about 850° C. with said heated feed gas in a mixing chamber to form a mixture of air and feed gas;

(f) partially combusting said mixture of air and feed gas to a temperature greater than about 850° C. to form a partially combusted gas mixture wherein said partially combusted gas mixture has a degree of oxidation of between about 0.27 to about 0.32 and a reducing power of between about 2 to about 3;

(g) feeding said partially combusted gas mixture to said direct reduced iron in said reactor so as to form a reformed reducing gas having an oxidation degree of between about 0.05 to about 0.09;

(h) contacting said iron oxide material with said reformed reducing gas so as to form direct reduced iron;

(i) contacting said direct reduced iron with a carburizing agent in said reactor at a temperature of between about 550° C. to about 750° C. so as to form iron carbide having between about 40% wt to about 5.5% wt carbon and at least about 80% wt iron wherein a reactor top gas is formed;

(j) recycling reactor top gas from said reactor so as to provide a feed gas having a methane content Of at least about 8.5% by volume; and (k) repeating steps (a), (b) and (d) through (j).

2. A process according to claim 1, wherein said reformed reducing gas comprises $H_2$, CO and $CH_4$ and has a ratio by volume of $CH_4/(CO+H_2)$ of between about 1:10 to about 1.4:10.

3. A process according to claim 2, wherein said step of contacting said iron oxide material with said reformed reducing gas provides said direct reduced iron containing carbon in an amount between about 0.1% wt to about 1.0% wt.

4. A process according to claim 2, wherein said reformed reducing gas contains $CH_4$ in an amount by volume of between about 9% to about 12%.

5. A process according to claim 1, wherein said recycling step includes the step of preheating said top gas with said combustion flue gas from said heating step.

6. A process according to claim 5, wherein said top gas is preheated to a temperature of between about 200° C. to about 300° C.

7. A process according to claim 1, wherein step (h) provides a direct reduced iron having a degree of metallization of between about 90% to about 93%.

8. A process according to claim 1, wherein said carburizing agent comprises a gas mixture containing at least about 80% methane by volume and a balance selected from the group consisting of $H_2$, CO, $CO_2$ and mixtures thereof.

9. A process according to claim 1, wherein said mixture of air and feed gas is partially combusted to a temperature of between about 1000° C. to about 1100° C.

10. A process according to claim 1, wherein said partially combusted mixture has a ratio by volume of $CH_4/(CO_2+H_2O)$ of between about 0.60:1 to about 0.63:1.

11. A process according to claim 10, wherein said partially combusted gas mixture mixes in said reactor with excess carburizing agent containing $CH_4$ so that said mixture of partially combusted gas and carburizing agent has a ratio by volume of $CH_4/(CO_2+H_2O)$ of between about 0.65:1 to about 0.9:1.

12. A process according to claim 1, wherein said partially combusted gas mixture mixes in said reactor with excess carburizing agent containing $CH_4$ so that said mixture of partially combusted gas and carburizing agent has a ratio by volume of $CH_4/(CO_2+H_2O)$ of between about 0.65:1 to about 0.9:1.

13. A process according to claim 1, wherein said step of contacting said iron oxide material with said reformed reducing gas forms direct reducing iron in an endothermic reaction, whereby temperature of said direct reduced iron is between about 800° C. to about 850° C.

14. A process according to claim 13, wherein excess carburizing agent further cools said direct reduced iron to a temperature of between about 600° C. to about 750° C..

15. A process according to claim 1, further including flowing said iron oxide material, said direct reduced iron and said iron carbide through said reactor in a descending manner so that excess carburizing agent flows in an ascending manner and mixes with incoming partially combusted gas mixture to form a gas mixture which is reformed by contact with said direct reduced iron to form said reformed reducing gas for reducing said iron oxide material in a reduction zone in said reactor.

16. A process according to claim 15, further including preheating said iron oxide material to a temperature of between about 500° C. to about 550° C.

17. A process according to claim 16, wherein said preheating pre-reduces said iron oxide material descending to said reduction zone to a degree of metallization of between about 70% to about 80%.

18. A process according to claim 1, further including cooling said iron carbide by contacting said iron carbide with a cooling gas.

19. A process according to claim 18, wherein said cooling gas contains $CH_4$ in an amount by volume of between about 8% to about 10% and has a ratio by volume of $CO/CO_2$ of between about 1.4 to about 2.0 whereby said iron carbide is further carburized by said cooling gas.

20. A process according to claim 19, wherein said further carburizing is carried out at a temperature of between about 350° C. to about 400° C.

21. A process according to claim 18, wherein said cooling step reduces a temperature of said iron carbide to between about 50° C. to about 60° C.

22. A process according to claim 1, wherein reaction top gas discharged from said reactor has a ratio by volume of $CH_4/CO_2$ of between about 0.58 to about 1.0, a ratio by volume of $CO/CO_2$ of between about 1.4 to about 1.83, and a ratio by volume of $H_2H_2O$ of between about 1.38 to about 2.0.

23. A process according to claim 1, wherein the metal oxide material contains between about 63% to about 70% iron by weight.

24. A process according to claim 1, wherein step (e) comprises mixing said heated feed gas with oxygen enriched air having a ratio by volume of air to oxygen of between about 7:1 to about 1:7.

25. A process according to claim 1, wherein said partially combusted gas mixture is fed to said direct reduced iron at a rate of between about 1100 to about 1200 $NM^3$/ton direct reduced iron.

26. A process according to claim 1, further including contacting said direct reduced iron with said carburizing agent at a temperature of between 620° C. to about 680° C.

* * * * *